(12) United States Patent
Everts

(10) Patent No.: US 11,388,238 B2
(45) Date of Patent: Jul. 12, 2022

(54) LOCALIZED SITUATIONAL INTELLIGENT AWARENESS FROM MULTIPLE SENSOR TYPES THROUGH A 4-DIMENSIONAL STATE SYSTEM

(71) Applicant: Sugey LLC, Lancaster, PA (US)

(72) Inventor: Richard Everts, Lancaster, PA (US)

(73) Assignee: Bestie Bot Inc., Lancaster, PA (US)

( * ) Notice: Subject to any disclaimer, the term of this patent is extended or adjusted under 35 U.S.C. 154(b) by 140 days.

(21) Appl. No.: 16/869,048

(22) Filed: May 7, 2020

(65) Prior Publication Data

US 2020/0382598 A1 Dec. 3, 2020

Related U.S. Application Data

(60) Provisional application No. 62/856,347, filed on Jun. 3, 2019.

(51) Int. Cl.

| | | |
|---|---|---|
| *H04L 67/12* | (2022.01) | |
| *G08B 21/04* | (2006.01) | |
| *H04L 67/10* | (2022.01) | |
| *G08B 25/01* | (2006.01) | |
| *H04L 12/28* | (2006.01) | |

(52) U.S. Cl.
CPC .......... *H04L 67/12* (2013.01); *G08B 21/0446* (2013.01); *G08B 25/016* (2013.01); *H04L 12/2803* (2013.01); *H04L 67/10* (2013.01)

(58) Field of Classification Search
CPC ... G08B 25/016; G08B 21/0446; H04L 67/10; H04L 67/12; H04L 12/2803
USPC .......................................................... 709/224
See application file for complete search history.

(56) References Cited

U.S. PATENT DOCUMENTS

| | | | | |
|---|---|---|---|---|
| 2015/0097949 | A1* | 4/2015 | Ure | G08B 5/223 348/143 |
| 2018/0040223 | A1* | 2/2018 | Bodi | G08B 21/086 |
| 2019/0042867 | A1* | 2/2019 | Chen | G06N 3/063 |
| 2020/0210127 | A1* | 7/2020 | Browy | H04L 67/12 |
| 2020/0298394 | A1* | 9/2020 | Han | B25J 13/087 |
| 2020/0344299 | A1* | 10/2020 | Sohail | H04L 47/821 |
| 2021/0279475 | A1* | 9/2021 | Tusch | G06K 9/00248 |

* cited by examiner

*Primary Examiner* — Frantz B Jean
(74) *Attorney, Agent, or Firm* — Penn State Law IP Clinic

(57) ABSTRACT

The present invention describes a computer implemented method for training a home monitoring system comprising of a plurality of occupational sensors, a plurality of computing devices, and a server network that communicate over a network. The plurality of occupational sensors can transmit information from the occupational sensors to the server; upon receiving the information from the plurality of occupational sensors, the server can generate and maintain a three-dimensional model of the environment. The server can then identify a first action performed by the special needs user based on the three-dimensional model of the environment and the information from the plurality of occupational sensors. Upon identifying the first action performed by the user, the server can determine a second action to be performed by a computing device; the server then transmits the second action to be performed to the computing device, which can then perform the second action.

15 Claims, 2 Drawing Sheets

LOCALIZED SITUATIONAL INTELLIGENT AWARENESS FROM MULTIPLE SENSOR TYPES THROUGH A 4-DIMENSIONAL STATE SYSTEM

CROSS-REFERENCE

This application claims the benefit of U.S. Provisional Application No. 62/856,347, filed Jun. 3, 2019, which application is incorporated herein by reference.

BACKGROUND OF THE INVENTION

In recent times, users have access to multiple smart devices in their homes that monitor different aspects of their homes. For example, users have access to smart thermostats that regulate the temperature of a user's home based on whether the user is at home or not. Existing systems only give stationary reports about the users and the environment. Existing systems at most automate the process of performing certain actions once the user or the system indicates that the action may be performed.

Additionally, existing systems transfer and store a large amount of data off site. The practice of transferring all the data from sensors to an off-site server for processing increases the system's bandwidth consumption and storing the data off site also costs a lot in terms of storage space.

Thus, what is needed is a system that can observe the user's environment constantly, dynamically help the user by identifying user actions, performing actions, and/or reacting in a way the user needs, while at the same time, not consuming increased amount of bandwidth.

SUMMARY OF THE INVENTION

The present invention describes a computer implemented method for training a home monitoring system comprising of a plurality of occupational sensors, a plurality of computing devices, and a server network that communicate over a network. In the present invention the plurality of occupational sensors can transmit information from the occupational sensors to the server; upon receiving the information from one or more of the plurality of occupational sensors, the server can generate and maintain a three-dimensional model of the environment. The server can then identify a first action performed by the special needs user based on the three-dimensional model of the environment and the information from one or more of the plurality of occupational sensors. Upon identifying the first action performed by the user, the server can determine a second action to be performed by a computing device; the server then transmits the second action to be performed to the computing device, which can then perform the second action.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The present disclosures generally relate to a home sensing network trained to identify a special needs users actions and predict what the special needs user might need. The system may include a plurality of occupational sensors (101) that sense the user's environment. Based on the data from the occupational sensors, the system can build a 3D image and/or model of the environment using neural networks. Once the system builds the 3D image of the environment, the system may store the 3D environment and/or the changes in the 3D environment as a change of state. Based on the 3D environment and data from a plurality of occupational sensors, using a neural network the system can identify the action the user is performing. Once the system identifies the action the user is performing, the system can identify an action that the computational device may perform to assist the user. The system can then transmits the action the computing device (220) may perform to assist the user to the computing device (220).

Figure 1:
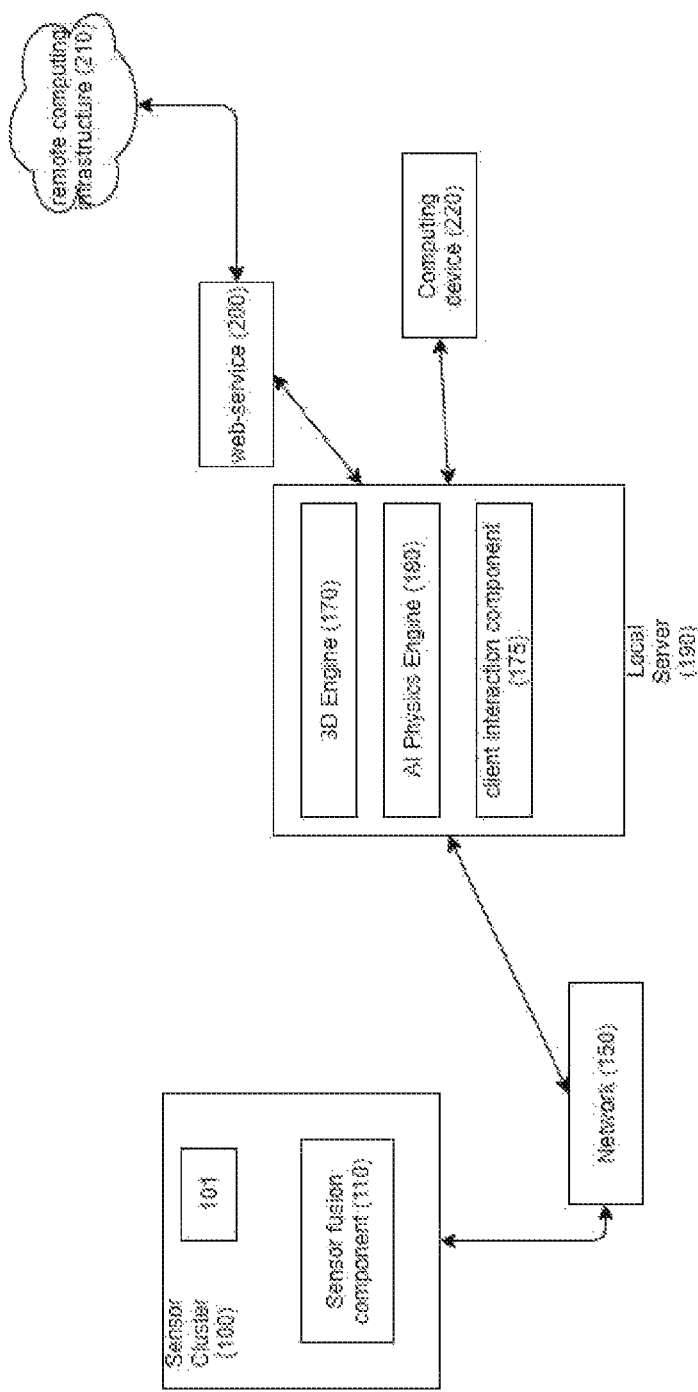
FIG. 1 is an overview of one embodiment of the system including a plurality of occupational sensors (101), a sensor fusion component (110), a server system (190), a computing device (220), a client interaction component (175), a remote computing infrastructure (210), an AI physics engine (180), and a 3D engine (170) that communicate over a network (150) and/or a web service (200).
Figure 2:
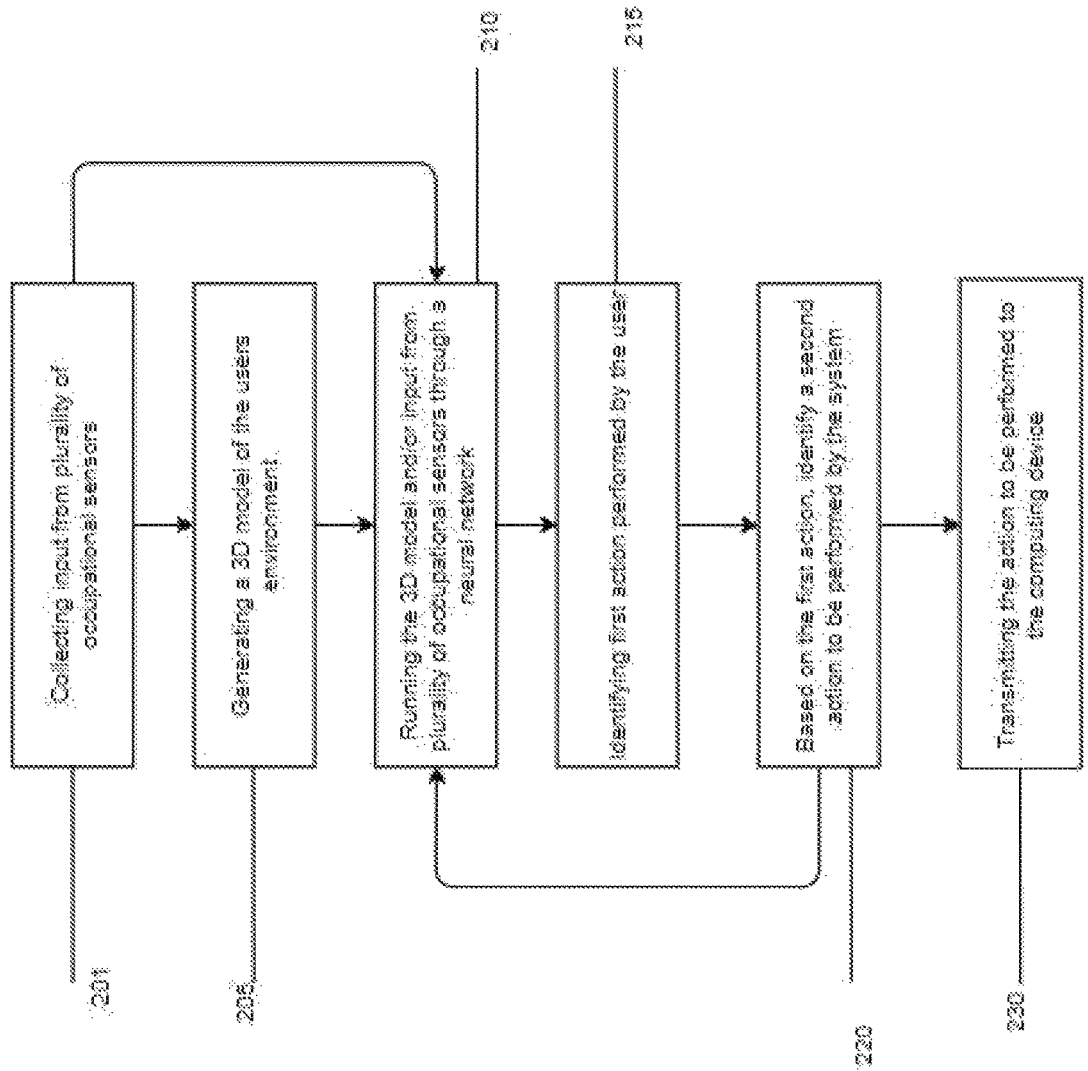
FIG. 2 illustrates a logic flow diagram for a process of identifying and predicting user action based on the 3D environment and occupational data.

FIG. 1 depicts an overview of a preferred embodiment of the present disclosure. In some embodiments, a user is present in an environment that is being monitored by a plurality of occupational sensors (101). The occupational sensors, through sensor fusion hardware (110) can distribute sensors data processes, can perform error handling, and can send the data to the local server (190). The occupational sensors (101) can send their data to the local server (190) and the local server (190) can route the data to the 3D engine (170). The 3D engine (170) then constructs a 3D model of the user's environment. The 3D model may contain general physics data, data about standard objects, and other mapping data. Based on the current 3D model and incoming sensor data, the 3D engine (170) stores changes in the environment as changes in states in the 3D model. Storing the changes in the user's environment as a difference in state exponentially saves the storage required to store information about the 3D environment. Additionally, storing the changes in the user's environment as a difference also reduces the bandwidth required to send the data about the 3D environment to the remote computing infrastructure (210) via a web-service (200).

In some embodiments, the 3D model can be generated using neural networks. Neural networks can generate inferences from the data by observing the data from one or more of the plurality of occupational sensors (101).

In some embodiments, once the 3D engine (170) generates the 3D model of the environment, the 3D model, and/or the data from the plurality of occupational sensors can be sent to the AI physics engine (180). The AI physics engine (180) utilizes computationally intelligent algorithms, neural networks, or other inferencing algorithm(s) to process the incoming occupational sensor data and 3D model data to identify the user's actions. Once the AI physics engine (180) identifies the user's actions, the AI physics engine (180) identifies whether the computing device may perform an action or not to assist the user. If the computing device (220) must perform an action, then the AI physics engine (180) can determine what action the computing device (220) must perform in response to the user's action or to assist the user in his/her actions. Once the AI physics engine (180) identifies the action the computing device (220) must perform, the AI physics engine (180) can transmit that information to the local server (190). The local server (190) may then transmit the actions that the computing device (220) must perform to the computing device.

In some embodiments, a user, who may be a special needs user, could be trying to button up his shirt. The occupational sensors can detect the environment and can transmit the data about the environment to the local server (190). The local server (190) can route the information to the 3D engine (170) that can construct a 3D model of the user's environment. The 3D model may contain general physics data, data about standard objects, and other mapping data, and timing data. Based on the current 3D model and incoming sensor data, the 3D engine (170) can store changes in the environment as changes in states in the 3D model. The 3D engine (170), after generating the 3D model of the environment, can send the 3D model, and/or the data from the plurality of occupational sensors to the AI physics engine (180). The AI physics engine (180) can analyze the data and identify the user's action of buttoning up his shirt. The AI physics (180) engine may use skeleton tracking from the RGB depth cameras to identify the user's action of buttoning up his shirt. The AI physics engine (180) may also classify videos from a camera or an audio-visual device into feature vectors or series of vectors and then infer an action from the action label on the vector to identify the action performed by the user. The AI physics engine (180) may also use audio data to infer the actions of the user using natural language processing tools. The user may also manually enter the action he/she is performing. Once the AI physics engine (180) identifies the action performed by the user, the AI physics engine (180) may suggest actions to help the user in his task. To determine if the user needs help, the AI physics engine (180) may check the user's progress based on the change in state of the 3D environment, the incoming data from the occupational sensors, and/or the time taken by the user to progress in his/her task. Once the AI physics engine (180) determines that the user needs help, the AI physics engine (180) may decide to perform one or more actions to help the user. In some embodiments, the AI physics engine (180) may direct the computational device to broadcast the directions to complete the task. In other embodiments, the AI physics engine (180) may direct the computing device (220) to show images related to completing the task. In some embodiments, after the user completes the task of buttoning the shirt, the AI physics engine (180) may check that the user has put on pants before he leaves the home. If the user has not put on pants, the AI physics engine (180) may direct the computing device (220) to remind the user to put on pants.

In other embodiments, the AI physics engine (180) can identify that the user in the environment is incapacitated, has requested assistance himself/herself, or may need assistance in any other capacity. If the AI physics engine (180) identifies that the user in the environment is incapacitated, has requested assistance himself/herself, or may need assistance in any other capacity, the AI physics engine (180) may direct the computational device to call an emergency service or to call the user's care person. In some embodiments, the AI physics engine (180) may automatically direct the computational device to send updates to the user's care person periodically.

The AI physics engine (180) may also use manual user input to identify and/or train the system in identifying user's actions. The inferences and insights generated by the AI physics engine (180) can be adjusted based on the local users' preferences to increase the accuracy of the system. In some embodiments, the AI physics engine (180) may identify the users actions based on machine learning, skeleton tracking, facial recognition, gait recognition, natural language processing, and active inference prediction.

The AI physics engine (180) can also store inferences about the user on the local server (190). In some embodiments, the user inferences and user information may be stored on the remote computing infrastructure (210). In some embodiments, the AI physics engine (180) may use data from the remote computing infrastructure (210) to train its own computationally intelligent algorithms, neural networks, or other inferencing algorithm to process the incoming occupational sensor data and 3D model data to identify the user's actions. In some embodiments, the AI physics engine (180) may send data to the remote computing infrastructure (210) to train the computationally intelligent algorithms, neural networks, or other inferencing algorithm to process the incoming occupational sensor data and 3D model data to identify the user's actions.

The AI physics engine (180) may use the help of remote computing infrastructure (210), like cloud computing, to perform some of the computations on and generate inferences from the data generated by the occupational sensors. The AI physics engine (180) may use a web-service (200) for communication between the remote computing infrastructure (210) and the local server components (190).

The present invention describes a system comprising of a plurality of occupational sensors and a plurality of computational devices connected to a network. These devices may be intelligent and have many sensory capabilities, and may communicate with each other via a server network, the internet, or the intranet.

In some embodiments, the system may contain one or more RGB depth sensors. In some embodiments, the system may contain one or more motion sensors. In some embodiments, the system may contain one or more audio-visual sensors. In some embodiments, the system may contain one or more thermal sensors. In some embodiments, the system may contain one or more microphones. In some embodiments, the system may contain one or more speakers. In some embodiments, the system may contain one or more camera.

In some embodiments, the system may occupational sensors may contain a sensor fusion component (110). The sensor fusion component (110) may be coded to distribute sensor data processes, perform error handling, perform AI inferencing, and/or provide user feedback. In some embodiments, the sensor fusion component (110) may perform raw calculations on the data from the occupational sensors to reduce the amount of data sent to the local server (190). During processing of the data from the occupational sensors, the sensor fusion component (110) may use previously processed data to learn and infer which data might be useful and only send useful data to the local server. Thus, the sensor fusion component (110) reduces the bandwidth required to transmit data from the occupational sensors to the local server (190).

The occupational sensor data may be sent to the local server (190) via the network component (150). The network used to transmit the data from occupational sensors can be a closed network or intranet. In some embodiments, the network used to transmit the data from occupational sensors can be the internet.

The local server (190) contains the AI physics engine (180) and the 3D engine (170). The local server (190) also contains a client interaction component (175). The client interaction component (175) can transmit information from the 3D engine (170) and AI physics engine (180) to the remote computing infrastructure (210) to perform some of the computations on and can generate inferences from the data generated by the occupational sensors.

FIG. 1 depicts an overview of a preferred embodiment of the present disclosure. The system comprises of plurality of occupational sensors. The occupational sensors can collect data from the environment. The sensor cluster (100) is the collection of the occupational sensors. In some embodiments, the sensor cluster (100), then transfers the simplified data to the on-site server via the internal network or the internet. Once the server has the simplified data, the 3D engine (170) generates a 3D image of the environment. The 3D engine (170) also logs information on events happening in the environment and saves the changes in the environment as a difference in standard states.

The AI physics engine (180) can perform computations on a combination of the 3D environment data and data from one or more of the plurality of occupational sensors. The AI physics engine (180) can then identify the actions the user has performed and further what actions the system must perform. The AI physics engine (180) can then send the actions the system must perform to the computing device (220) and/or to one or more of the plurality of occupational sensors. The computational device or one or more of the occupational sensors may perform the action as directed by the AI physics engine (180).

The local server (190) also communicates with the cloud via a web-service (200) to connect to external computational devices. The local server (190) may be virtually divided into sections. In some embodiments, one section of the local server (190) may access any external computing device (220). Whereas another section of the local server (190) may access only the devices and occupational sensors within the network.

The proposed system can train itself on the data from a plurality of occupational sensors like thermostats, motion detectors, RGB depth sensors, depth sensors, cameras, and other sensors that help measure different aspects of the user's environment.

In some embodiments, this invention may combine RGB in depth sensing and thermal imaging into one neural network. So instead of putting RGB into one neural network and training the system, the present invention can combine some or all sensor input into one neural network, can generate inferences from that sensor input to provide 3D images and/or 3D models of the environment based on the output of that combined neural network. This same data stream combining some or all of the sensor input can be input into another neural network, that can inference that data stream and perform the human action prediction/training in the system.

Therefore, this system that can train itself to understand and predict the needs of the user based on the data it generates or observes. The claimed invention assists the user in performing certain tasks. The claimed invention trains itself on the data from a plurality of occupational sensors. Based on the data and training, the system then assists the user in a task that the user is performing. The claimed invention also processes the data from the occupational sensors at a local server (190) on site, and transfers information in the form of states for processing off site. Thus, transferring primarily state information reduces the amount of data transferred and the amount of storage required at the off-site server.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A computer implemented method for training a home monitoring system comprising:
   a plurality of occupational sensors;
   a plurality of computing devices;
   a server network;
   wherein the plurality of occupational sensors transmits information from the occupational sensors to the server;
      upon receiving the information from one or more of the plurality of occupational sensors, the server generates and maintains a three-dimensional model of the environment, wherein the three-dimensional model is generated having a first state and changes to objects in the environment are maintained as one or more differences relative to the first state;
      the server identifies a first action performed by the special needs user based on the one or more differences and the information from one or more of the plurality of occupational sensors;
      upon identifying the first action performed by the user, the server determines a second action to be performed by a computing device;
      the server then transmits the second action to be performed to the computing device, which then performs the second action.

2. The computer implemented method of claim 1, wherein the server identifies a third action performed by the user based on the three-dimensional model and information from one or more of the plurality of occupational sensors;
   upon identifying a third action performed by the user, the server determines a fourth action to be performed by the computing device to help the user;
   the server then transmits a fourth action to be performed to the computing device, which then performs a fourth action.

3. The computer implemented method of claim 1, wherein the computing device modifies the three-dimensional model of the environment based on information from one or more of the plurality of occupational sensors as a difference in standard state.

4. The computer implemented method of claim 1, wherein one of the sensors in the plurality of sensors is an RGB depth sensor.

5. The computer implemented method of claim 1, wherein one of the sensors in the plurality of sensors is a thermal sensor.

6. The computer implemented method of claim 1, wherein one of the sensors in the plurality of sensors is an audio-visual sensor.

7. The computer implemented method of claim 1, wherein one of the sensors in the plurality of sensors is a microphone.

8. The computer implemented method of claim 1, wherein one of the sensors in the plurality of sensors is a motion sensor.

9. The computer implemented method of claim 1, wherein the second action to be performed by the computing device is updating the status of the special needs user with a care-person.

10. The computer implemented method of claim 1, wherein after identifying the first action performed by the special needs user, the second action to be performed by the computing device is advising the special needs user about the next steps in the first action performed by the special needs user.

11. The computer implemented method of claim 1, wherein the second action to be performed by the computing device is contacting an emergency service.

12. The computer implemented method of claim 2, wherein the fourth action to be performed by the computing device is updating the status of the special needs user with a care-person.

13. The computer implemented method of claim 2, wherein after identifying the third action performed by the special needs user, the fourth action to be performed by the computing device is advising the special needs user about the next steps in the third action performed by the special needs user.

14. The computer implemented method of claim 2, wherein the fourth action to be performed by the computing device is contacting an emergency service.

15. The computer implemented method of claim 1, wherein the objects are inanimate.

* * * * *